United States Patent
Wang et al.

(10) Patent No.: US 11,121,746 B2
(45) Date of Patent: Sep. 14, 2021

(54) DYNAMIC SWITCHING BETWEEN SU-MIMO AND MU-MIMO TRANSMISSION

(71) Applicant: Apple Inc., Cupertino, CA (US)

(72) Inventors: Ping Wang, San Jose, CA (US);
Guoqing Li, Campbell, CA (US);
Veerendra Boodannavar, Cupertino, CA (US); Daniel R. Borges, San Francisco, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/023,607

(22) Filed: Jun. 29, 2018

(65) Prior Publication Data
US 2020/0007199 A1    Jan. 2, 2020

(51) Int. Cl.
*H04B 7/04*      (2017.01)
*H04B 7/0452*    (2017.01)
*H04W 84/12*    (2009.01)

(52) U.S. Cl.
CPC .......... *H04B 7/0452* (2013.01); *H04W 84/12* (2013.01)

(58) Field of Classification Search
CPC .... H04B 7/0452; H04B 7/0689; H04W 84/12
See application file for complete search history.

(56) References Cited

U.S. PATENT DOCUMENTS

| | | | |
|---|---|---|---|
| 2005/0249186 A1* | 11/2005 | Kelsey | H04L 1/203 370/349 |
| 2008/0273485 A1* | 11/2008 | Tsigler | H04W 92/12 370/328 |
| 2011/0116488 A1* | 5/2011 | Grandhi | H04W 28/18 370/338 |
| 2015/0055482 A1* | 2/2015 | Larson | H04L 1/08 370/242 |
| 2015/0230231 A1* | 8/2015 | Fornoles, Jr. | H04B 7/0452 455/509 |
| 2016/0157213 A1* | 6/2016 | Takeda | H04L 1/1822 370/329 |
| 2017/0331529 A1* | 11/2017 | Lee | H04B 7/0452 |
| 2019/0320485 A1* | 10/2019 | Kim | H04W 76/25 |
| 2020/0007199 A1* | 1/2020 | Wang | H04B 7/0452 |

* cited by examiner

*Primary Examiner* — Huy D Vu
*Assistant Examiner* — Bao G Nguyen
(74) *Attorney, Agent, or Firm* — Sterne, Kessler, Goldstein & Fox P.L.L.C.

(57) ABSTRACT

Disclosed herein are system, method, and computer program product embodiments for indicating a preference to receive a single-user multiple input multiple output (SU-MIMO) or multi-user multiple input multiple output (MU-MIMO) transmission from an access point (AP). Embodiments include generating a standard action frame that contains an action field that species a preference to receive a SU-MIMO or MU-MIMO transmission from the AP. A station (STA) can transmit the generated action frame to the AP. The STA can receive an acknowledgement frame from the AP that indicates the AP is configured to use the requested transmission method. The STA can then receive data from the AP using the requested transmission method.

22 Claims, 10 Drawing Sheets

DYNAMIC SWITCHING BETWEEN SU-MIMO AND MU-MIMO TRANSMISSION

BACKGROUND

Technical Field

This disclosure relates to the field of wireless communications, including multi-user multiple-input and multiple-output (MU-MIMO) transmission in a wireless local area network (WLAN).

Background

A wireless communication protocol may support MU-MIMO transmission. For example, the Institute of Electrical and Electronics Engineers (IEEE) 802.11ac wave2 standard (current proposals and/or future versions) supports MU-MIMO transmission. In a MU-MIMO transmission, an access point (AP) can simultaneously transmit data streams to a group of stations (STAs). Each STA in the group gets a dedicated data stream. This is in contrast to a single-user multiple-input and multiple-output (SU-MIMO) transmission where the AP can transmit data streams to a single STA at a time.

A MU-MIMO transmission is an efficient way to transmit a large amount of data (e.g., real-time audio and video) to a group of STAs in a WLAN. A MU-MIMO transmission can be more efficient than a SU-MIMO transmission because the AP does not have to switch transmissions between different STAs. Thus, a MU-MIMO transmission can increase network utilization (e.g., higher aggregate throughput), and throughput to each STA in dense environments (e.g., environments with many STAs).

But a MU-MIMO transmission may not be the best performing transmission method for a particular STA. This can be due to several reasons. For example, a MU-MIMO transmission can be sensitive to STA mobility. In particular, transmission performance can degrade when a STA moves very quickly. Also, a MU-MIMO transmission can have significant overhead. This overhead can result in a STA having better performance using a SU-MIMO transmission than a MU-MIMO transmission. Further, the performance gain of an MU-MIMO transmission is often dependent on the scheduler and precoder design of the AP. Different APs can have different MU-MIMO transmission performance based on their schedulers and precoders.

For at least these reasons, a STA participating in a MU-MIMO transmission may have lower transmission performance than in a SU-MIMO transmission. In addition, a STA participating in a MU-MIMO transmission can suffer from increased power usage due to the process of additional channel sounding and the generation of channel beamforming feedback, and therefore can have lower battery life.

SUMMARY

According to some embodiments, a standard compliant action frame including a preference to join a SU-MIMO or MU-MIMO transmission can be used to toggle a STA's participation in a SU-MIMO or MU-MIMO transmission in a wireless communications protocol. As would be appreciated by a person of ordinary skill in the art, joining a SU-MIMO or MU-MIMO transmission can include receiving the SU-MIMO or MU-MIMO transmission. In some embodiments, the wireless communications protocol may be for the Institute of Electrical and Electronics Engineers (IEEE) 802.11ac wave2 standard (current proposals and/or future versions) or various other wireless communication protocols.

In some embodiments, the action frame can be a standard compliant vendor specific action frame. The vendor specific action frame can be a type of action frame specific to a given vendor (such as the vendor of the AP) in accordance with a standard, such as the IEEE 802.11ac wave2 standard (current proposals and/or future versions) or various other wireless communication protocols In some embodiments, the action frame can include a MU toggle field for indicating a preference to join a SU-MIMO or MU-MIMO transmission. A STA can transmit the action frame to the AP to indicate its preference to join the SU-MIMO or MU-MIMO transmission from the AP. The AP can transmit an acknowledgement frame to the STA to indicate the preference request was granted. The acknowledgement frame can be a block acknowledgement (ACK) action frame that is standard compliant in accordance with a standard, such as the IEEE 802.11ac wave2 standard (current proposals and/or future versions) or various other wireless communication protocols. Thereafter, the STA can configure itself to receive data from the AP using its preferred transmission method (e.g., a SU-MIMO or MU-MIMO transmission).

In some embodiments, the action frame can include a cause field for indicating a cause for why the STA does not want to join a MU-MIMO transmission. The action frame can also include a cost field for indicating a cost of the cause specified in the cause field.

In some embodiments in which the STA prefers to join a MU-MIMO transmission, the action frame can include a data stream field that indicates the preferred number of data streams the STA wants to use. The action frame can also include a bandwidth field that indicates a preferred bandwidth amount for the STA.

In some embodiments, the AP can determine whether to grant the STA's preference request to join a SU-MIMO transmission based on the amount of overhead in the existing MU-MIMO transmission, the network utilization, the number of STAs in the MU-MIMO group, and various other factors as would be appreciated by a person of ordinary skill in the art. The AP can also determine whether to grant the STA's preference request to join a SU-MIMO transmission based on the cause for why the STA does not want to join the MU-MIMO transmission. The AP can further determine whether to grant the STA's preference request to join a SU-MIMO transmission based on the cost of the cause for why the STA does not want to join the MU-MIMO transmission.

In some embodiments, the STA can use a timer to prevent frequent toggling between a SU-MIMO and MU-MIMO transmission. The STA can set a timer after receiving an acknowledgement frame from the AP indicating its preference request was granted. The STA can then wait for the timer to expire before attempting to transmit an action frame to change its preference to join a SU-MIMO or MU-MIMO transmission from the AP.

In some embodiments, the STA can wait a period of time before retransmitting an action frame to the AP if the STA performed a maximum number of retransmissions of the action frame to the AP without receiving an acknowledgement frame from AP. The STA can keep track of the number of times it retransmitted the action frame to the AP using a retransmission count. The STA can use a timer to control the period of time before attempting to retransmit the action frame to the AP.

In some embodiments, the STA can transmit an action frame after it receives a channel sounding frame from the AP. The STA can also transmit an action frame as needed. For example, the STA can transmit the action frame prior to receiving a channel sounding frame from the AP, or once the STA knows there is incoming traffic for it.

In some embodiments, the STA can determine whether there is an in progress transmission/reception before transmitting the action frame to the AP. The STA can then transmit the action frame once the in progress transmission/reception is completed.

In some embodiments, if the STA does not want to join a MU-MIMO transmission, the STA can transmit a no acknowledgement (ACK) action frame indicating its SU-MIMO decision that is standard compliant after it receives a channel sounding frame from the AP. This is in contrast to the STA transmitting channel beamforming feedback (CFB) after it receives a channel sounding frame from the AP. Because the STA transmits a no ACK action frame, the AP does not have CFB from the STA and therefore is not going to allocate a MU-MIMO transmission to the STA.

In some embodiments, a STA may not want to participate in a MU-MIMO transmission with a particular type of AP. The STA can determine the particular type of AP (e.g., vendor and or model number of the AP) from a field or information element (IE) in a beacon frame from the AP. The STA can then indicate during association with the AP (e.g., by transmitting an association response frame to the AP) that the STA is capable of receiving a SU-MIMO or MU-MIMO transmission based on the type of the AP.

Other features of the present disclosure will be apparent from the accompanying drawings and from the detailed description.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
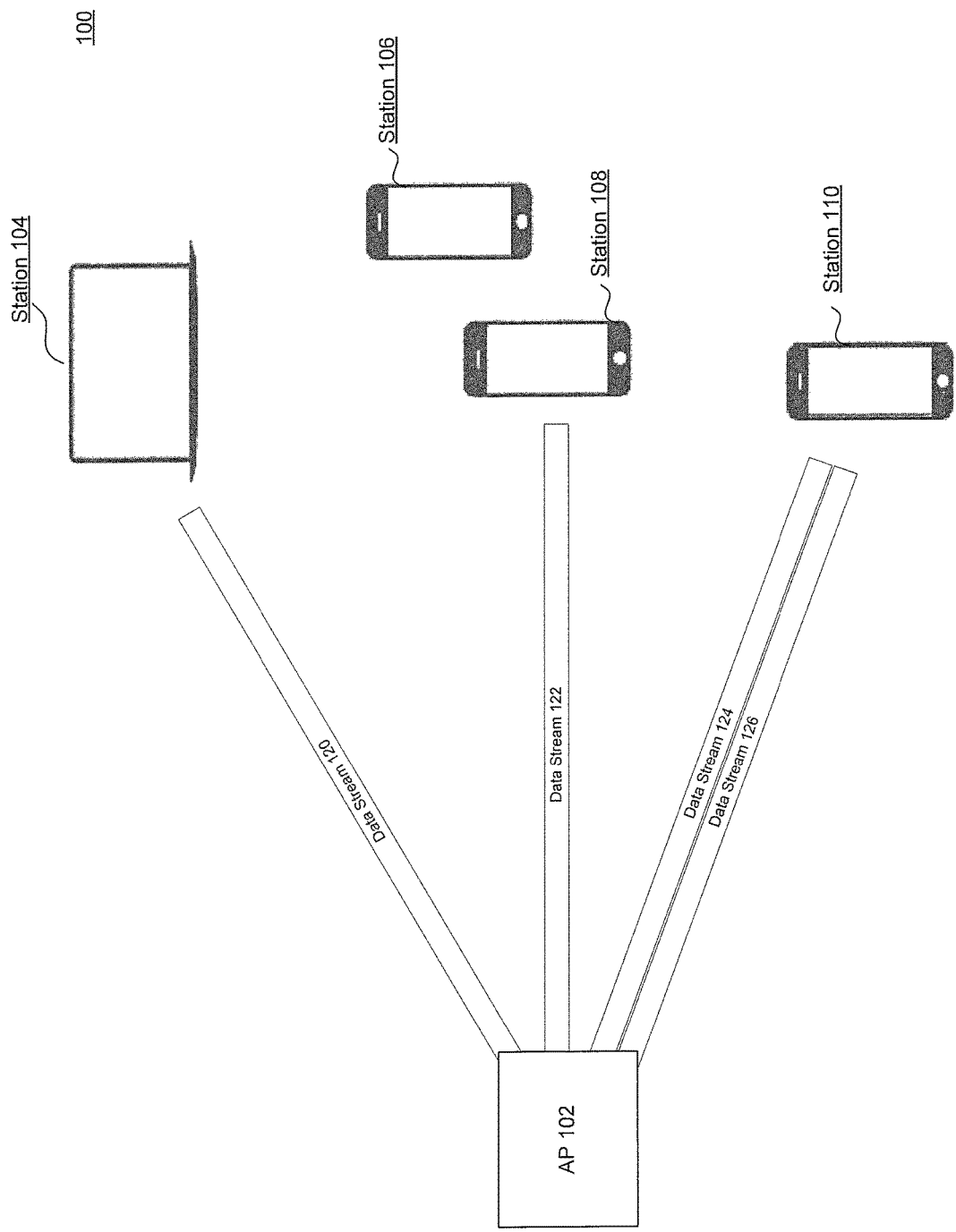
FIG. 1 illustrates an example system implementing MU-MIMO transmission toggling, according to some embodiments.

Provided herein are system, apparatus, device, method and/or computer program product embodiments, and/or combinations and sub-combinations thereof, for a STA (STA) (e.g., wearable device, smartphone, tablet, laptop, etc.) to notify an access point (AP) of its preference join a single-user multiple-input and multiple-output (SU-MIMO) or multi-user multiple-input and multiple-output (MU-MIMO) transmission. As would be appreciated by a person of ordinary skill in the art, joining a SU-MIMO or MU-MIMO transmission can include receiving the SU-MIMO or MU-MIMO transmission. Some embodiments operate by the STA transmitting an action frame that is standard compliant to the AP. The action frame may be a vendor specific action frame that includes a multi-user (MU) toggle field indicating the STA's preference to join a SU-MIMO or MU-MIMO transmission. The AP can determine whether to accept the STA's request. The AP can transmit an acknowledgment frame indicating the STA's request was granted. Thereafter, the STA can configure itself to participate in its preferred transmission from the AP.

A wireless communication protocol may support MIMO transmission. For example, the Institute of Electrical and Electronics Engineers (IEEE) 802.11ac wave2 standard (current proposals and/or future versions) supports MIMO transmission. In a MIMO transmission, an AP can simultaneously transmit multiple data streams over the same radio signal. It is noted that IEEE 802.11ac wave2 is presented only as an example, and the techniques of the disclosure can be implemented, as appropriate, in any compatible standard or proprietary implementation.

An AP can use SU-MIMO transmission or MU-MIMO transmission. In a SU-MIMO transmission, an AP can transmit multiple data streams to a single STA at a time. Specifically, the AP can transmit multiple data streams to a first STA for a first period of time. The AP can then transmit multiple data streams to a second STA for a second period of time. The AP can transmit again to the first STA, e.g., after it has transmitted to each of the remaining STAs. In other words, in a SU-MIMO transmission, a STA can wait in line to communicate one-at-a-time with the AP.

In a SU-MIMO transmission, the AP can rapidly switch transmitting between different STAs. While this rapid switching can make it appear like each STA receives a non-interrupted data stream, each STA can still wait in line to communicate one-at-a-time with the AP. While these wait times can be small, they can add up when more STAs ask for resources.

An AP using a SU-MIMO transmission may not be able to support multiple STAs having high bandwidth requirements. This is because the AP transmits data streams to a single STA at a time. For example, the AP may be unable to stream an Ultra-high-definition (UHD) movie to a first STA (e.g., a television) in a living room and a second UHD movie to a second STA (e.g., a laptop) in a bedroom. This is because the high bandwidth requirements of both the first STA and the second STA may not be satisfied by the data stream interruptions caused by the AP switching transmissions between the first STA and the second STA.

A MU-MIMO transmission can solve these problems. Specifically, instead of each data stream being periodically interrupted as in a SU-MIMO transmission, an AP using a MU-MIMO transmission can keep its signal constant to each STA, and fairly distribute the bandwidth to each STA without compromising the speed (or throughput to) of any other STA at the same time. In other words, in a MU-MIMO transmission, an AP can simultaneously transmit data streams to a group of STAs. Each STA in the group gets a dedicated data stream. A MU-MIMO transmission is therefore like a multi-lane highway in which each STA in the group of STAs gets its own lane. In contrast, a SU-MIMO transmission is like a single lane road shared by each STA.

In a MU-MIMO transmission, each STA in the group of STAs gets a dedicated data stream. For example, the IEEE 802.11ac wave2 standard (current proposals and/or future versions) supports simultaneously transmitting data streams to up to four MU-MIMO capable STAs. A MU-MIMO transmission can be based on spatial reuse in which the same radio channel can be used in different areas by the same AP. In other words, the AP can simultaneously transmit to spatially separate STAs (e.g., a first STA in a living room and a second STA in a bedroom). However, if two STAs are close together, then both STAs may have to share the same data stream like in a SU-MIMO transmission. Thus, in order to perform a MU-MIMO transmission, an AP may need to select a group of STAs that are spatially separated.

The AP can exchange information with its associated STAs to identify a group of spatially separate STAs. The AP can then "steer" its data streams to particular STAs. The IEEE 802.11ac wave2 standard (current proposals and/or future versions) supports a channel sounding process to perform these identification and steering functions called transmit beamforming (TxBF). As would be appreciated by a person of ordinary skill in the art, the AP can perform these functions using various other beamforming methods.

The AP can use channel sounding to determine the positions of its associated STAs. Specifically, the AP can send a channel sounding frame to each STA to determine its position. The channel sounding frame can contain a known pattern of radio frequency (RF) symbols from any/all antennas of the AP. This can allow the receiving STA to construct a feedback matrix for how any/all of its antenna hear each transmit antenna of the AP. In response, a STA can transmit its feedback matrix to the AP as compressed beamforming feedback (CFB). The AP can then select a group of STAs for simultaneously communication using a MU-MIMO transmission.

The AP can compute a steering matrix that describes how to "steer" particular data streams to STAs in the group. Specifically, the AP can compute phase offsets for each data stream to each STA in the group. The AP can use these computed offsets to simultaneously transmit the data streams to each STA in the group.

A MU-MIMO transmission can often increase network utilization (e.g., higher aggregate throughput). A MU-MIMO can also increase throughput to each STA in dense environments (e.g., environments of many STA). But a MU-MIMO transmission may not be the best performing transmission method for a particular STA. This can be due to several reasons. For example, a MU-MIMO transmission can be sensitive to STA mobility. In particular, MU-MIMO transmission performance can degrade when a STA moves very quickly. As a result, there may be no performance gain associated with a MU-MIMO transmission. Also, an MU-MIMO transmission can have significant overhead. For example, a MU-MIMO transmission can involve an AP sending a channel sounding frame, and receiving CFB from each STA. This overhead can result in a STA having better performance using a SU-MIMO transmission than a MU-MIMO transmission. Further, the performance gain of a MU-MIMO transmission can be dependent on the scheduler and/or precoder design of the AP. Different APs can have different MU-MIMO transmission performance based on their schedulers and/or precoders. A STA may get better transmission performance from an AP using a SU-MIMO transmission than a MU-MIMO transmission when the AP has a poor scheduler and/or precoder design for the MU-MIMO transmission.

Provided herein are systems and methods for allowing a STA to dynamically toggle its preference to join a SU-MIMO or MU-MIMO transmission from an AP. Specifically, in view of the technological limitations mentioned above, what is needed are systems and methods for allowing a STA to indicate its preference to not join a MU-MIMO transmission. This can improve transmission performance from the AP to the STA. This also can reduce power usage at the STA and therefore improve battery life. Further, this can give the STA flexibility on joining a MU-MIMO transmission, e.g., based on its traffic profile and/or motion characteristics. Additionally, this can increase airtime usage efficiency and decrease power usage by reducing the transmission of channel sounding frames and CFB.

FIG. 1 illustrates an example system 100, according to some embodiments of the disclosure. System 100 includes an access point (AP) 102 and STAs 104, 106, 108, and 110 in a WLAN. Together with AP 102, STAs 104, 106, 108, and 110 form a basic service set (BSS). A BSS may be a single AP together with all associated STAs. It is to be appreciated that system 100 may include other STAs in addition to or in place of the STAs illustrated in FIG. 1 without departing from the scope and spirit of this disclosure. These other STAs include, but are not limited to, a desktop computer, laptop, smartphone, tablet, touchpad, wearable electronic device, smart watch, or other electronic device.

AP 102 may perform SU-MIMO or MU-MIMO transmission to STAs 104, 106, 108, and 110. AP 102 may perform these transmissions using a wireless local network connection (such as, but not limited to, IEEE 802.11 standard, which is sometimes referred to as "Wi-Fi") or another wireless connection. For illustration purposes, examples will be provided in the context of an IEEE 802.11ac wave2 WLAN.

In FIG. 1, AP 102 can use a MU-MIMO transmission to simultaneously transmit four data streams to STAs 104, 106, 108, and 110. AP 102 transmits data stream 120 to STA 104, data stream 122 to STA 106 or STA 108, and data streams 124 and 126 to STA 110.

In order to simultaneously transmit these four data streams to STAs 104, 106, 108, and 110, AP 102 determines whether STAs 104, 106, 108, and 110 are at spatially diverse locations. AP 102 can use channel sounding to determine the positions of STAs 104, 106, 108, and 110. After determining their positions, AP 102 can select a group of STAs to simultaneously transmit to using a MU-MIMO transmission.

For example, in FIG. 1, STAs 104, 106, 108, and 110 are part of a group receiving a MU-MIMO transmission. AP 102 can use beamforming to "steer" each data stream to a particular STA (e.g., by manipulating the phase of the signal coming out of each of its antennas).

In FIG. 1, AP 102 determines that STAs 104, 106, 108, and 110 are at three spatial diverse locations. STA 104 is at a first location, STAs 106 and 108 are at a second location, and STA 110 is at a third location. AP 102 can simultaneously transmit to STA 104, one of STAs 106 and 108, and STA 110. AP 102 may be unable to simultaneously transmit to STAs 106 and 108 because they are not at spatially diverse locations. Thus, AP 102 may need to rapidly switch transmitting stream 122 to STA 106 and STA 108. In other words, AP 102 can transmit data stream 122 to STA 106 and STA 108 as though they are a part of a SU-MIMO transmission.

As discussed above, a MU-MIMO transmission can often increase network utilization (e.g., higher aggregate throughput), and increase throughput to each STA in dense environments (e.g., many STAs). As a result, if a STA capable of receiving a MU-MIMO transmission associates with an AP capable of MU-MIMO transmission, the AP attempts to use a MU-MIMO transmission with the STA. But a MU-MIMO transmission may not be the best performing transmission method for a particular STA. For example, if STA 110 moves around a lot, there may be a decrease in transmission performance associated with a MU-MIMO transmission to STA 110. This may be because AP 102 may need to repeatedly redetermine the spatial locations of STAs 104, 106, 108, and 110 in response to the change in location of STA 110. This can result in the increased transmission of channel sounding frames from AP 102, and CBF from STAs 104, 106, 108, and 110. Moreover, even if STA 110 does not move around a lot, there may still be high overhead due to the transmission of channel sounding frames and CBF. This high overhead may decrease transmission performance associated with the MU-MIMO transmission to STA 110. Finally, AP 102 may use a poor scheduler or precoder for the MU-MIMO transmission to STA 110. This may decrease transmission performance associated with the MU-MIMO transmission to STA 110.

Thus, higher transmission performance may be available for a STA (e.g., STA 110) if it uses a SU-MIMO transmission from AP 102. In addition, using a SU-MIMO transmission with STA 110 may improve a MU-MIMO transmission to other STAs (e.g., STAs 104, 106, 108) as the inaccuracy of the CBF from STA 110 can lead to suboptimal generation of the steering matrix that can cause higher multi-user interference to other STAs in the same MU-MIMO group. But there is no conventional way for a STA to dynamically toggle its preference not to join a MU-MIMO transmission, let alone based on its unique motion characteristics and traffic profile.

In some embodiments, this technological problem can be solved by a STA (e.g., STA 110) transmitting a vendor specific action frame that is standard compliant to an AP (e.g., AP 102) to indicate its preference to not join a MU-MIMO transmission using a wireless communication protocol. Upon reception of the vendor specific action frame, the AP can decide whether to grant the STA's request. The AP can indicate the STA's request is granted by responding to the STA with an acknowledgement frame (e.g., a block acknowledgement (ACK) action frame that is standard compliant). The STA can then consider the request granted. Because the STA uses a vendor specific action frame that is standard compliant, the STA can indicate its preference to not join a MU-MIMO transmission without violating the frame format standard of the wireless communication protocol. Moreover, because the STA can use a vendor specific action frame, the STA an indicate its preference to not join a MU-MIMO transmission without impacting APs that do not support such preference requests.

Figure 2:
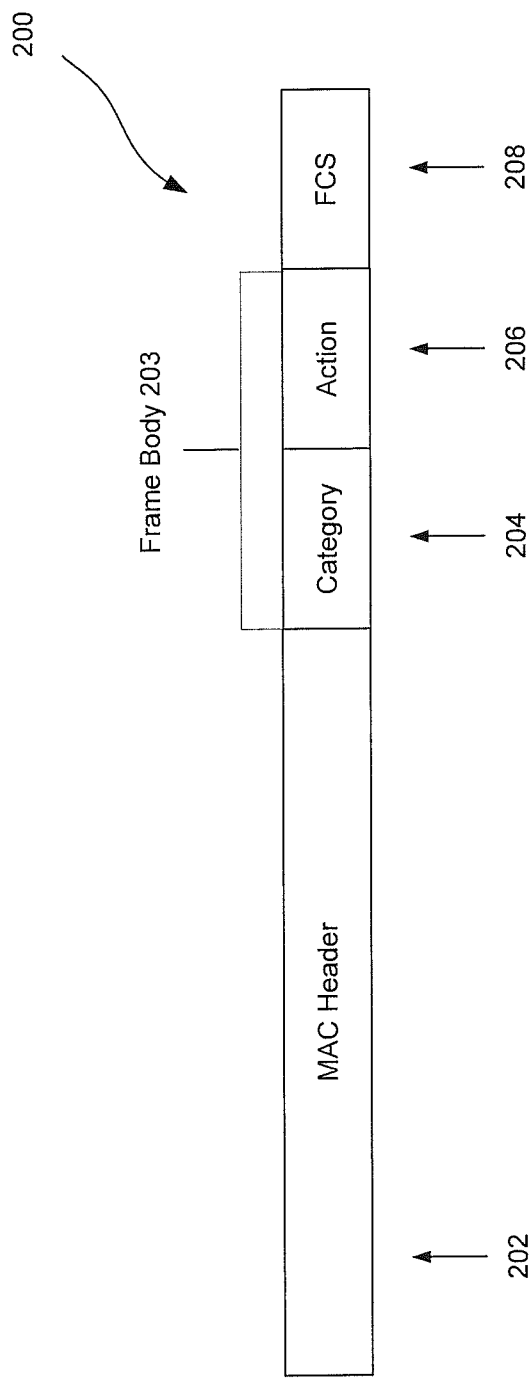
FIG. 2 is a block diagram of an example standard compliant action frame for indicating a preference to join an SU-MIMO or MU-MIMO transmission, according to some embodiments.

FIG. 2 describes an example embodiment of a vendor specific action frame that is standard compliant that a STA can use to indicate its preference to join a SU-MIMO or MU-MIMO transmission in an 802.11ac wave2 network. As would be appreciated by a person of ordinary skill in the art, the vendor specific action frame of FIG. 2 can be used by a STA to indicate its preference to join a SU-MIMO or MU-MIMO transmission in various other wireless communication protocols.

FIG. 2 is a block diagram of an example standard compliant action frame 200 for indicating a STA's preference to join a SU-MIMO or MU-MIMO transmission, according to some embodiments. Example action frame 200 therefore addresses the above technological problems. FIG. 2 is discussed with reference to FIG. 1. For example, in FIG. 1, STA 110 may transmit action frame 200 to AP 102 to indicate its preference to join a SU-MIMO or MU-MIMO transmission from AP 102. Action frame 200 may be transmitted in accordance with a standard, such as the IEEE 802.11ac wave2 standard (current proposals and/or future versions) or various other wireless communication protocols. As would be appreciated by a person of ordinary skill in the art, action frame 200 can be transmitted by a STA to indicate its preference to join a SU-MIMO or MU-MIMO transmission in accordance with various other wireless communication protocols.

Action frame 200 can be a standard compliant type of wireless communication protocol frame such as an IEEE 802.11 MAC Protocol Data Unit (MPDU). An action frame can be a standard compliant type of management frame that can used to trigger an action at an AP (e.g., AP 102) or a STA (e.g., STA 104). Action frame 200 can be a vendor specific action frame that is standard complaint. In other words, action frame 200 can contain fields uniquely defined and capable of being processed by a particular vendor (e.g., the vendor of AP 102).

Action frame 200 can include a MAC header 202, a frame body 203 containing category field 204 and action field 206, and a frame check sequence (FCS) 208. MAC header 202 can be a set of fields at the beginning of a frame that enables the action frame 200 to be transmitted in accordance with a wireless communication protocol. The set of fields can occur in a fixed order. MAC header 202 can contain information related to frame control, MAC addressing, duration, and sequence control.

For example, MAC header 202 can include a frame control field and an address 1 field. The frame control field can include a type subfield and a subtype subfield. The type subfield can indicate the type of the frame (e.g., a management, control, or data frame). For example, the type subfield can indicate action frame 200 is a standard complaint management frame. The subtype field can indicate action frame 200 is a particular subtype of frame (e.g., a particular type of management frame such as an action frame). The address 1 field can include the receiver device address (e.g., the immediate recipient of the frame such as AP 102).

Frame body 203 can be a variable length field that contains information specific to an individual frame type and subtype. Because action frame 200 is a standard compliant action frame, frame body 203 can include category field 204 and action field 206. Category field 204 can indicate that action frame 200 is a particular type of action frame. Category field 204 can store a specific value to indicate the action frame type. For example, category field 204 can indicate action frame 200 is a block acknowledgment (ACK) action frame using the value "3.". Category field 204 can also indicate action frame 200 is a vendor specific action frame. For example, category field 204 can store a particular value reserved to indicate action frame 200 is a vendor specific action frame in accordance with a wireless communication protocol standard. For example, category field 204 can use the value "126" to indicate action frame 200 is a vendor specific protected action frame, and the value "127" to indicate action frame 200 is a vendor specific action frame.

Action field 206 can indicate an action to perform by AP 102 in response to receiving action frame 200. Action field 206 can store different values to specify different actions. Action field 206 can also include additional information specific to the one or more specified actions. In the case of a vendor specific action frame, action field 206 can include vendor specific actions and related information. For example, action field 206 can indicate a STA's (e.g., STA 110) preference to join a SU-MIMO or MU-MIMO transmission from AP 102. In other words, a STA can indicate its preference to join a SU-MIMO or MU-MIMO transmission by specifying a particular action in action field 206 of action frame 200.

FCS 208 can be a field containing a cyclic redundancy check (CRC) to detect changes to raw data of action frame 200. As would be appreciated by a person of ordinary skill in the art, FCS 208 can be used by AP 102 and/or any/all of STA 104, 106, 108, and 110, to detect errors in the transmission of action frame 200.

Figure 3:
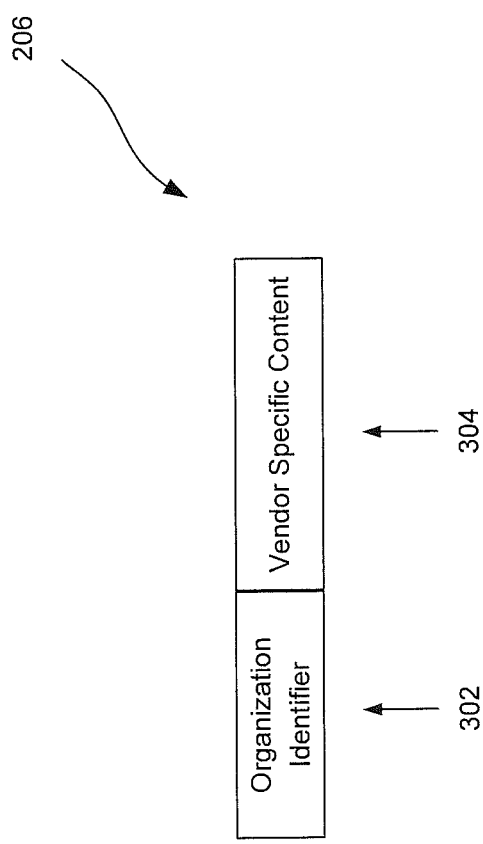
FIG. 3 is a block diagram of an example action field in a standard compliant action frame for indicating a preference to join an SU-MIMO or MU-MIMO transmission, according to some embodiments.

FIG. 3 is a block diagram of an example action field 206 of a standard compliant action frame 200 for indicating a STA's preference to join a SU-MIMO or MU-MIMO transmission, according to some embodiments. Action field 206 can represent one or more vendor specific actions and related information based on category field 204 specifying a vendor specific action frame. Specifically, action field 206 can represent a preference to join a SU-MIMO or MU-MIMO transmission.

In the case of a STA wanting to indicate its preference to join a SU-MIMO transmission, action field 200 can indicate a cause for why it wants to join a SU-MIMO transmission, and thus does not want to join a MU-MIMO transmission. Action field 206 can indicate a cost associated with the indicated cause.

In the case of a STA wanting to indicate its preference to join a MU-MIMO transmission, action field 206 can indicate a STA's preference for a number of data streams to use in the MU-MIMO transmission. Action field 206 can further indicate a STA's preference for a bandwidth amount to use in the MU-MIMO transmission.

Action field 206 can contain an organization identifier field 302 and vendor specific content 304. Organization identifier field 302 can contain a vendor identifier for a vendor in accordance with a wireless communication protocol standard. As would be appreciated by a person of ordinary skill in the art, a list of vendor identifiers can be defined by the wireless communication protocol (e.g., IEEE 802.11ac wave2). The receiver of action frame 200 (e.g., AP 102) can use organization identifier field 302 to determine whether the action frame 200 is intended for the receiver. For example, AP 102 can determine whether the action frame 200 is intended for AP 102 by checking whether the vendor identifier in organization identifier field 302 matches (or is equivalent) to the vendor identifier associated with the vendor of AP 102. AP 102 can then process vendor specific content 304 based on action frame 200 being intended for AP 102. The use of organization identifier field 302 as part of using action frame 200 to indicate a STA's preference join a SU-MIMO or MU-MIMO transmission ensures that there is no impact on APs (e.g., AP 102) that do not allow a STA to indicate its preference to join a SU-MIMO or MU-MIMO transmission using action frame 200.

Vendor specific content 304 can indicate a preference of a STA (e.g., STA 110) to join a SU-MIMO or MU-MIMO transmission from an AP (e.g., AP 102). Vendor specific content 304 contains one or more vendor-specific fields, which can be specified by one or more particular vendors (e.g., the vendor of AP 102). The length of vendor specific content 304 can be limited by the maximum allowed frame size for a wireless communication protocol (e.g., the maximum MPDU size). Because action frame 200 can define vendor-specific fields in a standards complaint field allocated for vendor-specific fields, the indication of a preference of a STA (e.g., STA 110) to join a SU-MIMO or MU-MIMO transmission from an AP (e.g., AP 102) in these fields means that action frame 200 is standard compliant with the wireless communication protocol. In other words, because action frame 200 is a standard compliant vendor specific action frame it can be ignored by APs that do not support a STA indicating a preference to join a SU-MIMO or MU-MIMO transmission.

Figure 4:
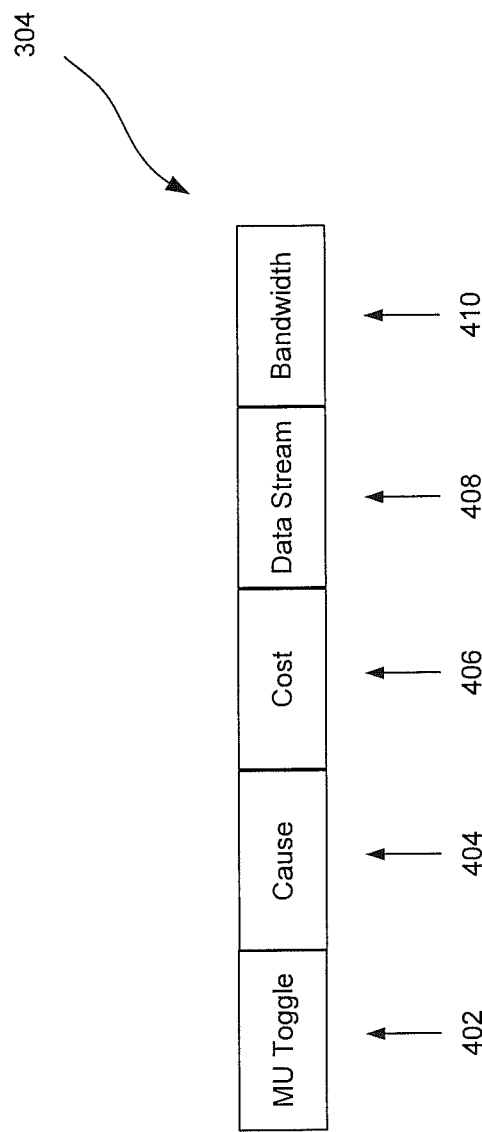
FIG. 4 is a block diagram of an example vendor specific content field in a standard complaint action frame for indicating a preference to join an SU-MIMO or MU-MIMO transmission, according to some embodiments.

FIG. 4 is a block diagram of an example vendor specific content 304 of a standard compliant action frame 200 for indicating a preference join a SU-MIMO or MU-MIMO transmission, according to some embodiments.

Vendor specific content 304 can include an MU toggle field 402, a cause field 404, a cost field 406, a data stream field 408, and a bandwidth field 410. Vendor specific content 304 can include a bitmap, e.g., at its beginning, to indicate the presence of one or more fields. As would be appreciated by a person of ordinary skill in the art, vendor specific content 304 can include various other fields.

MU toggle field 402 can be an action field that specifies an action to be performed at an AP (e.g., AP 102). MU toggle field 402 can contain a preference value for toggling between a SU-MIMO transmission and a MU-MIMO transmission. For example, MU toggle field 402 may be a single bit that is set to "0" to indicate a STA's preference to join a MU-MIMO transmission, and set to "1" to indicate the STA's preference to join a SU-MIMO transmission (e.g., to not join a MU-MIMO transmission).

For example, STA 110 may initially use a MU-MIMO transmission from AP 102. At some point in time in the future, STA 110 may determine that it would prefer to use a SU-MIMO transmission from AP 102. STA 110 can generate a standard compliant action frame 200 and set the MU toggle field 402 to "1" to indicate that it wants to join a SU-MIMO transmission from AP 102. STA 110 can then transmit the action frame 200 to AP 102.

Cause field 404 can contain a cause for why a STA (e.g., STA 110) wants to join a SU-MIMO transmission as opposed to a MU-MIMO transmission. For example, cause field 404 can indicate that the reason the STA does not want to join a MU-MIMO transmission is because it is overheating, its power usage is too high, or various other factors, as would be appreciated by a person of ordinary skill in the art. Cause field 404 can be set to one or more of multiple causes that indicate why the STA does not want to not join the MU-MIMO transmission. Cause field 404 can be large enough to represent the total number of different causes. For example, if there five causes, cause field 404 can be 3-bits in length, covering all five causes with $2^3=8$ possibilities.

Cost field 406 can contain a cost value associated with the cause indicated in cause field 404. Cost field 406 can indicate the significance of the cause. For example, cost field 406 can indicate the severity of the overheating cause reflected in cause field 404. In other words, cost field 406 can indicate how important it is for an AP (e.g., AP 102) to grant a STA's preference request in MU toggle field 402 in view of the cause indicated in cause field 404.

In the case of a STA wanting to indicate its preference to join a MU-MIMO transmission, data stream field 408 can contain a preference for the number of streams the STA wants to use in the MU-MIMO transmission. For example, STA 110 may use data stream field 406 to indicate that it wants to receive two data streams in a MU-MIMO transmission from AP 102. Data stream field 408 can be large enough to represent the total number of data streams capable of being received by a STA. For example, if there can be up to three data streams for a STA, data stream field 408 can be 2-bits in length, covering the total number of possible data streams with $2^2=4$ possibilities.

In the case of a STA wanting to indicate its preference to join a MU-MIMO transmission, bandwidth field 410 can contain a bandwidth amount that a STA wants to receive in a MU-MIMO transmission with an AP (e.g., AP 102). As would be appreciated by a person of ordinary skill in the art, a vendor (e.g., vendor of AP 102) can specify various bandwidth amounts. Bandwidth field 410 can be large enough to represent the total number of different bandwidth amounts capable of being received by a STA.

A STA (e.g., STA 110) can set its preference to join a SU-MIMO or MU-MIMO transmission in vendor specific content 304 based on its unique requirements (e.g., stationary vs. mobile, bandwidth preference, and knowledge of the vendor and model of the AP). Specifically, the STA can set MU toggle field 402 to indicate its preference to join a SU-MIMO or MU-MIMO transmission. As would be appreciated by a person of ordinary skill in the art, because vendor specific content 304 is specific to the vendor of the AP, the STA may set one or more additional fields of vendor specific content 304 based on the particular vendor of the AP.

The STA (e.g., STA 110) can then transmit action frame 200 containing its preference to join a SU-MIMO or MU-MIMO transmission to AP 102. AP 102 can determine whether to honor the preference request based on various factors. For example, AP 102 can make the determination based on any/all of the amount of overhead going on in a MU-MIMO transmission, the current network utilization, the number of STAs in the MU-MIMO transmission group, and various other factors as would be appreciated by a person of ordinary skill in the art. As would be appreciated by a person of ordinary skill in the art, AP 102 may make this determination differently depending on the vendor and/or model of AP 102.

In the case of a STA wanting to indicate its preference to join a SU-MIMO transmission, AP 102 can make the determination based on a cause specified by the STA in cause field 404. AP 102 can further consider a cost specified by the STA in cost field 406.

In the case of a STA wanting to indicate its preference to join a MU-MIMO transmission, AP 102 can make the determination based on a number of data streams specified by the STA in data stream field 408. AP 102 can further make the determination based on a bandwidth amount specified by the STA in bandwidth field 410.

If AP 102 decides to grant a STA's (e.g., STA 110) preference request to join a SU-MIMO or MU-MIMO transmission, AP 102 can transmit an acknowledgement frame to the STA to indicate the request was granted. For example, AP 102 can transmit a block ACK action frame that is standard complaint to the STA. The STA can then consider its request granted.

On the other hand, if AP 102 decides to not grant the preference request, AP 102 can avoid transmitting an acknowledgement frame to the STA. The STA can then proceed with receiving data from AP 102 using the original transmission method (e.g., SU-MIMO or MU-MIMO transmission). For example, if the STA originally joined a MU-MIMO transmission from AP 102, the STA can remain a part of the MU-MIMO transmission. The use of an acknowledgement frame to indicate a grant decision makes it possible to add STAs capable of indicating a preference to join a SU-MIMO or MU-MIMO transmission to an AP that does not support receiving an action frame 200 to indicate a preference to join a SU-MIMO or MU-MIMO transmission. This is because if the AP does not understand action frame 200, and its indication of a preference to join a SU-MIMO or MU-MIMO transmission, the AP will not send back an acknowledgment frame. Thus, the acknowledge frame ensures that the STA does not change to a SU-MIMO or MU-MIMO transmission in a WLAN where the AP does not support preference toggling between a SU-MIMO or MU-MIMO transmission.

As discussed above, a STA (e.g., STA 110) can transmit action frame 200 to an AP (e.g., AP 102) to indicate its preference to join a SU-MIMO or MU-MIMO transmission. A STA, using a processor, can make this decision based on various factors including its traffic profile, overheating issues, how often it moves around, and various other factors as would be appreciated by a person of ordinary skill in the art. As would be appreciated by a person of ordinary skill in the art, different vendors and models of the STA can make this decision differently. Moreover, the STA can continually reevaluate this decision. As a result, the STA may first indicate its preference to join a MU-MIMO transmission but later decide it would be better to use a SU-MIMO transmission. But if the STA frequently transmits an action frame 200 to change its preference request, this may cause unnecessary overhead on the network. This may also decrease network utilization.

Similarly, if the STA does not get an acknowledgement frame from AP 102 that its preference request was granted, the STA may assume that AP 102 did not receive action frame 200. But this may not be the case. First, AP 102 may not support receiving an action frame 200 that indicates a preference to join a SU-MIMO or MU-MIMO transmission. Second, AP 102 may not approve of the preference request because it may decrease network utilization or decrease performance between AP 102 and the STA. Thus, if the STA retransmits action frame 200 to AP 102 to indicate its preference to join a SU-MIMO or MU-MIMO transmission, it may create unnecessary overhead on the network, and decrease network utilization and bandwidth.

In some embodiments, this technological problem can be solved by the STA (e.g., STA 110) using a timer to prevent toggling to frequently. Specifically, the STA can set a timer after receiving an acknowledge frame from AP 102 indicating its preference request was granted. For example, the timer may be set for 5-20 seconds. The STA can then wait for the timer to expire before attempting to transmit an action frame 200 to change its preference to join a SU-MIMO or MU-MIMO transmission from AP 102. This can prevent frequent toggling between a SU-MIMO and a MU-MIMO transmission which can prevent a reduction in network utilization and a decrease in bandwidth.

In addition, the STA may wait a period of time before retransmitting an action frame 200 to AP 102 if the STA performed a maximum number of retransmissions of the action frame 200 to AP 102 without receiving an acknowledgement frame from AP 102. The STA can track the number of times it retransmitted the action frame 200 to AP 102 using a retransmit count. The STA may use a timer to control the period of time before attempting to retransmit the action frame 200 to AP 102.

For example, STA 110 can retransmit an action frame 200 to AP 102 a maximum number of times to indicate its preference to join a SU-MIMO or MU-MIMO transmission. After STA 110 retransmits the action frame 200 the maximum number of times, STA 110 can wait for a timer to expire before attempting to retransmit the action frame 200 to change its preference to join a SU-MIMO or MU-MIMO transmission from AP 102. If, however, STA 110 receives an acknowledgement frame from AP 102 before the timer is started, or before the timer elapses, the STA can reset its retransmit count.

A STA can determine its preference to join a SU-MIMO or MU-MIMO transmission based on any/all of various factors, including its bandwidth requirements, overheating issues, how often it moves around, and various other factors as would be appreciated by a person of ordinary skill in the art. As would be appreciated by a person of ordinary skill in the art, different vendors and/or models of the STA can make this decision differently. Once the STA determines its reception preference (e.g., join a SU-MIMO or MU-MIMO transmission), the STA can transmit an action frame 200 to the AP (e.g., AP 102) to indicate its preference to join a SU-MIMO or MU-MIMO transmission.

In some embodiments, the STA can transmit the action frame 200 after it receives a channel sounding frame from AP 102. In the case of the STA wanting to indicate its preference to join a SU-MIMO transmission, instead of responding with CFB, the STA can transmit the action frame 200 indicating its preference to join a SU-MIMO transmission (e.g., not join an MU-MIMO transmission). Because the STA transmits the action frame 200 instead of CFB to AP 102, AP 102 can avoid performing steering matrix calculations necessary to determine the location of the STA. This can reduce setup time of the MU-MIMO transmission for other STAs, and decrease power usage at AP 102. In addition, this can reduce the transmission of unnecessary overhead (e.g., CFB) on the WLAN.

In some other embodiments, the STA can transmit the action frame 200 as needed. For example, the STA can transmit the action frame 200 prior to receiving a channel sounding frame from AP 102. Because the STA transmits the action frame 200 prior to receiving the channel sounding frame, AP 102 can avoid transmitting unnecessary channel sounding frames to the STA. Alternatively, the STA can transmit the action frame 200 based on a presence of incoming traffic for the STA. For example, the STA can transmit the action frame 200 when it receives a beacon frame from AP 102.

A STA can determine whether it makes sense to toggle between using a SU-MIMO or MU-MIMO transmission from AP 102 at various times. But this can create a race condition. In particular, the STA can create a race condition if it attempts to transmit an action frame 200 during an in progress transmission. In order to solve this technological problem, the STA can check whether there is an in progress transmission. If so, the STA can wait for the in progress transmission to complete before transmitting action frame 200 to AP 102 to toggle between using a SU-MIMO or MU-MIMO transmission.

In some embodiments where the STA wants to indicate its preference to join a SU-MIMO transmission, instead of responding with action frame 200 or with CFB after receiving a channel sounding frame from the AP, the STA can transmit a no acknowledgement (ACK) action frame that is standard compliant to AP 102. This can indicate to AP 102 that the STA does not support joining a MU-MIMO transmission. This can cause AP 102 to use a SU-MIMO transmission with the STA. This can enable AP 102 to avoid performing steering matrix calculations necessary to determine the location of the STA. This can reduce setup time of the MU-MIMO transmission for other STAs, and decrease power usage at AP 102. In addition, this can reduce the transmission of unnecessary overhead (e.g., CFB) on the WLAN.

In some cases, a STA may want not to participate in a MU-MIMO transmission with certain vendors or models of AP 102. This is because the performance gain of an MU-MIMO transmission is often dependent on the scheduler or precoder design used at the AP (e.g., AP 102). Different AP vendors and different AP models can have different MU-MIMO transmission performance. In the case of some APs with inferior schedulers or precoder designs, a STA may achieve better performance using a SU-MIMO transmission rather than a MU-MIMO transmission. Thus, a STA may want to indicate with it is capable of SU-MIMO or MU-MIMO transmission depending on the particular vendor or model of AP 102.

This technological problem can be solved by using vendor and model information present in a beacon frame that is standard compliant to control how the STA (e.g., STA 110) indicates to AP 102 whether it is capable of SU-MIMO or MU-MIMO transmission. A beacon frame is a standard compliant management frame used by AP 102 to communicate the characteristics of the WLAN to STAs. This information can be used by STAs trying to connect to the WLAN, as well as STAs already associated to the WLAN (e.g., associated with the BSS). A beacon frame can be periodically sent by AP 102 to STAs. A beacon frame can include a very high throughput (VHT) capability field. The VHT capability field can indicate whether AP 102 supports a MU-MIMO transmission. For example, AP 102 can set a MU-MIMO beamformer bit in the VHT capability field to "1" to indicate AP 102 supports a MU-MIMO transmission.

But even if AP 102 supports a MU-MIMO transmission, a STA may not want to participate in a MU-MIMO transmission from AP 102 because the particular vendor or model of AP 102 has inferior MU-MIMO transmission performance. In this case, the STA can indicate it is not capable of receiving a MU-MIMO transmission at the time of association with AP 102. The STA can determine the particular vendor or model of AP 102 from a vendor identifier or model number in the beacon frame from AP 102. The STA can look up the vendor and or model number of AP 102 in a database stored in a memory accessible by a processor of the STA.

In some embodiments, a beacon frame that is standard compliant can include a standard compliant field containing the model number of AP 102. In some other embodiments, a beacon frame that is standard compliant can include an information element (IE) that specifies the vendor and or model number of AP 102. An IE can be a blob of data of varying size. An IE can include a tag field, a length field, and a data field. The tag field can identify the type of the IE. The length field can specify the length the IE. The data field can be a variable length field (e.g., the length can be specified by the length field) that contains data specific to the particular type of IE. For example, the data field can contain the vendor and or model number of AP 102.

Whether the vendor and or model number of AP 102 is specified in a field in the beacon frame or in an IE in the beacon frame, the STA can use the vendor and or model number to determine whether to indicate it is capable of receiving a SU-MIMO or MU-MIMO transmission from AP 102. For example, during association with AP 102, the STA can transmit an association response frame to AP 102 indicating it is capable of receiving a MU-MIMO transmission when the STA determines from the beacon frame that AP 102 is of a particular vendor and or model number. For example, the STA may consult a list of known vendors and or model numbers of AP that provide good MU-MIMO transmission performance. The STA can look up the vendor and or model number of AP 102 in a database stored in a memory accessible by a processor of the STA.

In some embodiments, when the STA determines from the beacon frame that AP 102 is a model of AP that is known to provide good MU-MIMO transmission performance, the STA can respond with an association response frame indicating it is capable of receiving a MU-MIMO transmission. Alternatively, the STA can respond with an association response frame indicating it is capable of receiving a SU-MIMO transmission when the STA determines that AP 102 is a model of AP that is known to provide inferior MU-MIMO transmission performance.

Figure 5:
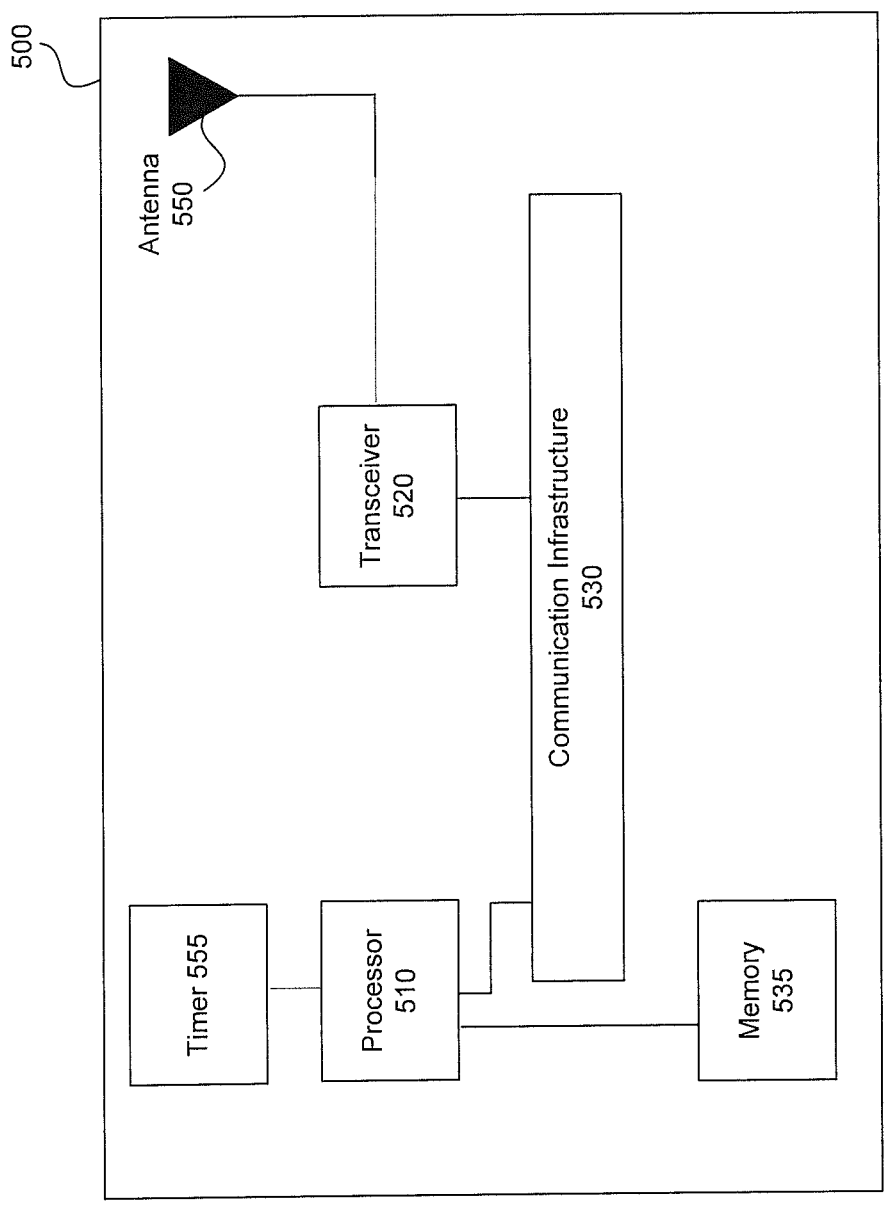
FIG. 5 illustrates a block diagram of an example station (STA) that supports indicating a preference to join a SU-MIMO or MU-MIMO transmission, according to some embodiments.

FIG. 5 illustrates a block diagram of an example STA 500 supporting indicating a preference to join an SU-MIMO or MU-MIMO transmission, according to some embodiments. STA 500 may be any of the STAs (e.g., 104, 106, 108, and 110) of system 100. STA 500 includes processor 510, transceiver 520, communication infrastructure 530, memory 535, antenna 550, and timer 555. Memory 535 may include random access memory (RAM) and/or cache, and may include control logic (e.g., computer software) and/or data. Processor 510 together with instructions stored in memory 535 perform operations enabling indicating a preference to join an SU-MIMO or MU-MIMO transmission. In some embodiments processor 510 and instructions in memory 535 together perform operations enabling indicating a preference to join an SU-MIMO or MU-MIMO transmission. Transceiver 520 transmits and receives communications signals (e.g. wireless signals) via antenna 550, including frame structures that support indicating a preference to join an SU-MIMO or MU-MIMO transmission according to some embodiments. Communication infrastructure 530 may be a bus. Antenna 550 may include one or more antennas that may be the same or different types. STA 500 can set timer 555 to prevent frequent toggling between a SU-MIMO and MU-MIMO transmission as discussed herein.

Figure 6:
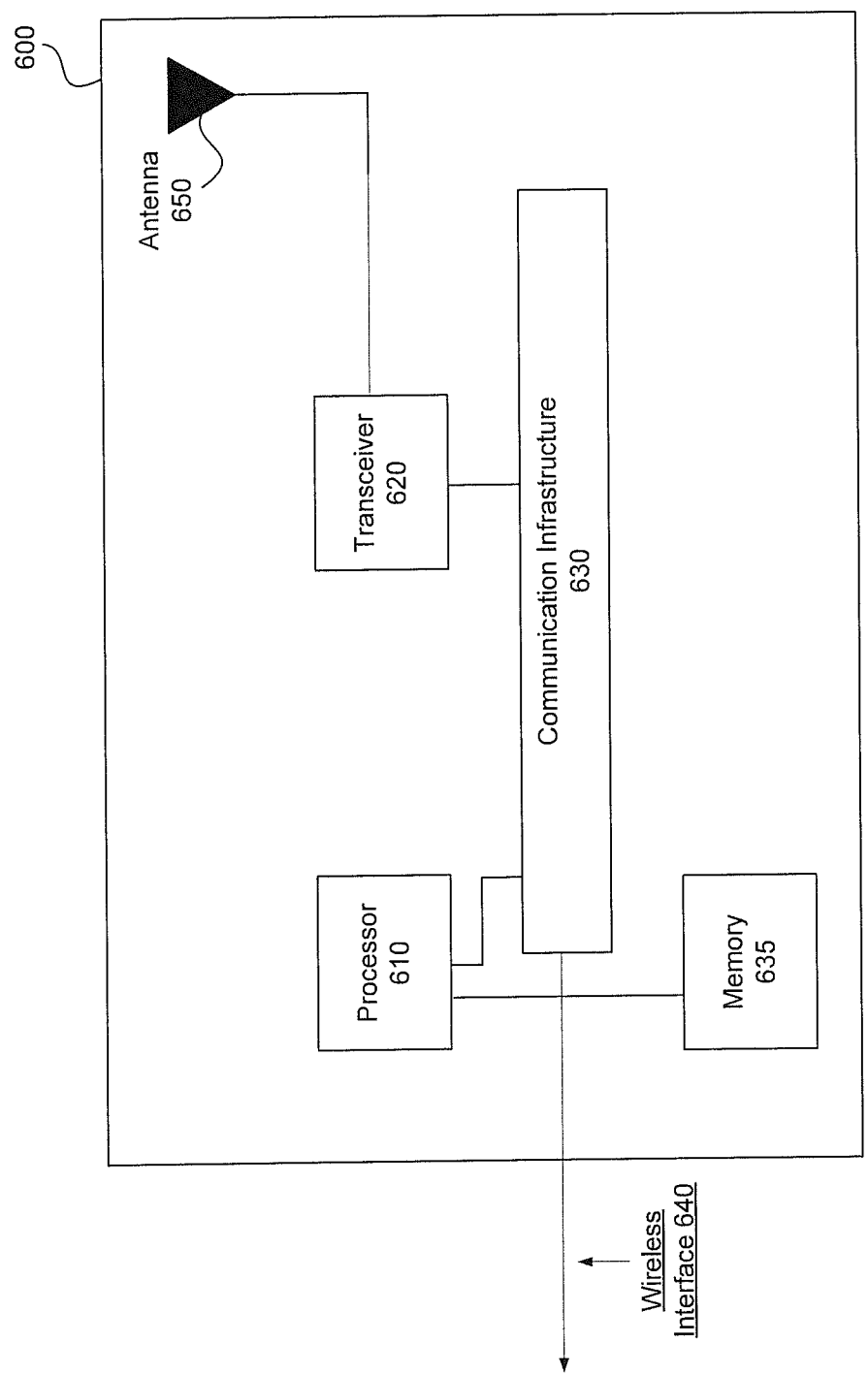
FIG. 6 illustrates a block diagram of an example access point (AP) that supports MU-MIMO transmission toggling, according to some embodiments.

FIG. 6 illustrates a block diagram of an example AP 600 supporting MU-MIMO transmission toggling, according to some embodiments. AP 600 may be any of AP (e.g., AP 102) of system 100. AP 600 includes processor 610, transceiver 620, communication infrastructure 630, memory 635, wireless interface 640, and antenna 650. Memory 635 may include random access memory (RAM) and/or cache, and may include control logic (e.g., computer software) and/or data. Processor 610 together with instructions stored in memory 635, performs operations enabling MU-MIMO transmission toggling. In some embodiments processor 610 and instructions in memory 635 together perform operations enabling MU-MIMO transmission toggling. Transceiver 620 can transmit and receive communications signals including frame structures that support MU-MIMO transmission toggling over wireless interface 640, and may be coupled to antenna 650. Communication infrastructure 630 may be a bus. Antenna 650 may include one or more antennas that may be the same or different types.

Figure 7:
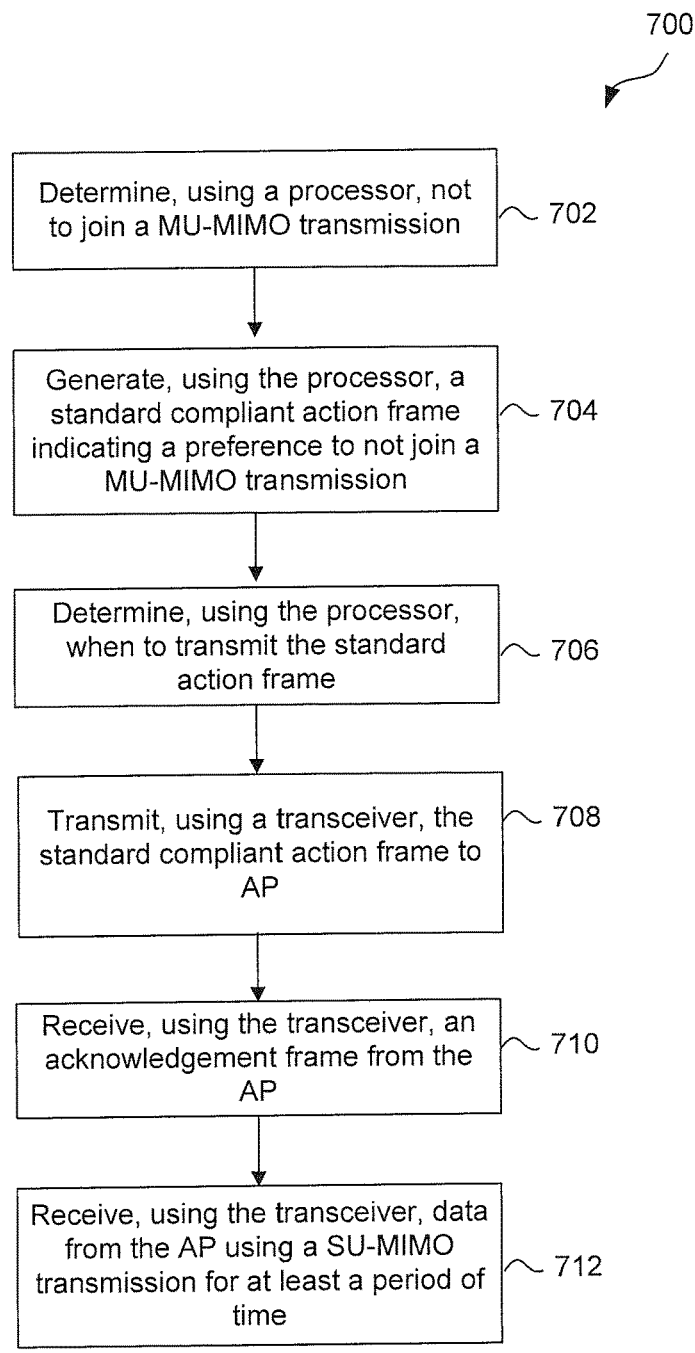
FIG. 7 is a flowchart of an example method for indicating a preference to not join a MU-MIMO transmission, according to some embodiments.

FIG. 7 is a flowchart of an example method 700 for indicating a preference not to join an MU-MIMO transmission, according to some embodiments. Method 700 can be performed by processing logic that can include hardware (e.g., circuitry, dedicated logic, programmable logic, microcode, etc.), software (e.g., instructions executing on a processing device), or a combination thereof.

In 702, a STA (e.g., STA 500), using a processor (e.g., processor 510), determines it does not want to join an MU-MIMO transmission. The STA can make this decision based on one or more factors including its traffic profile, overheating consideration, how often it moves around, and/or various other factors, as would be appreciated by a person of ordinary skill in the art.

In 704, the STA, using the processor, generates a standard compliant action frame 200 indicating its preference to not join an MU-MIMO transmission. The action frame 200 may be a standard compliant vendor specific action frame. The action frame 200 may include standard compliant fields such as those specified in the IEEE 802.11ac wave2 standard (current proposals and/or future versions) or various other wireless communication protocols. The action frame 200 may include a category field 204 containing a value indicating action frame 200 is a vendor specific action frame. The action frame 200 may include an action field 206 containing an organization identifier field 302 and vendor specific content 304. The organization identifier field may contain a unique vendor identifier. The STA, using the processor, can set the vendor identifier to the vendor of AP 102. Vendor specific content 304 can contain at least an MU toggle field 402. The STA, using the processor, can set the MU toggle field 402 to indicate its preference to not join the MU-MIMO transmission from AP 102. In other words, the STA, using the processor, can set the MU toggle field 402 to indicate its preference to join a SU-MIMO transmission from AP 102.

In some embodiments, the STA, using the processor, can indicate a cause for why it does not want to not join a MU-MIMO transmission. The STA, using the processor, can indicate the cause in cause field 404 of action frame 200. For example, the STA, using the processor, can indicate the cause for why it does not want to join a MU-MIMO transmission is that it is overheating. The STA, using the processor, can indicate the cost or severity of the cause for why it does not want to join a MU-MIMO transmission in cost field 406.

In 706, the STA, using the processor, optionally determines when to transmit the generated action frame 200 to AP 102. In some embodiments, the STA, using a transceiver (e.g., transceiver 520), can transmit the generated action frame 200 as needed. For example, the STA, using the transceiver, can transmit the generated action frame 200 once it knows there is traffic for it (e.g., when the STA receives a beacon frame from AP 102). In some embodiments, the STA, using the transceiver, can transmit the generated action frame 200 after it receives a channel sounding frame from the AP 102.

In some embodiments, if the action frame 200 is ready to be transmitted, the STA can determine whether there is an in progress transmission (or reception) at the STA. If so, the STA can wait for the in progress transmission (or reception) to complete before transmitting the action frame 200 to AP 102.

In some embodiments, the STA, using the processor, can determine whether a previous action frame 200 was sent to AP 102. If so, the STA, using the processor, can determine whether the current action frame 200 will be transmitted to AP 102 prior to expiration of a timer. The timer can be set to start from the reception of an acknowledgement frame from AP 102 for the previous action frame 200. If the current action frame 200 would be transmitted to AP 102 prior to expiration of the timer, the STA can wait to transmit the current action frame 200 until after the expiration of the timer.

In some embodiments, the STA, using the processor, can determine whether it performed a maximum number of retransmissions of action frame 200 to AP 102 without receiving an acknowledgement frame from AP 102. If so, the STA can wait a period of time before retransmitting action frame 200 to AP 102. The STA may use a timer to control the period of time before attempting to retransmit the action frame 200 to AP 102.

In 708, the STA, using the transceiver, transmits the action frame 200 to AP 102.

In 712, the STA, using the transceiver, receives an acknowledgement frame from AP 102 indicating AP 102 granted the STA's request to switch to a SU-MIMO transmission. The STA can then receive the SU-MIMO transmission from AP 102.

In 714, the STA, using the transceiver, optionally receives data from AP 102 using the SU-MIMO transmission for a period of time. In some embodiments, the STA starts a timer after receiving the acknowledgement frame from AP 102. The STA then continues receiving data using the SU-MIMO transmission until the timer expires. In some embodiments, the timer can be set to, e.g., 5 to 20 seconds, but any duration can be selected.

Figure 8:
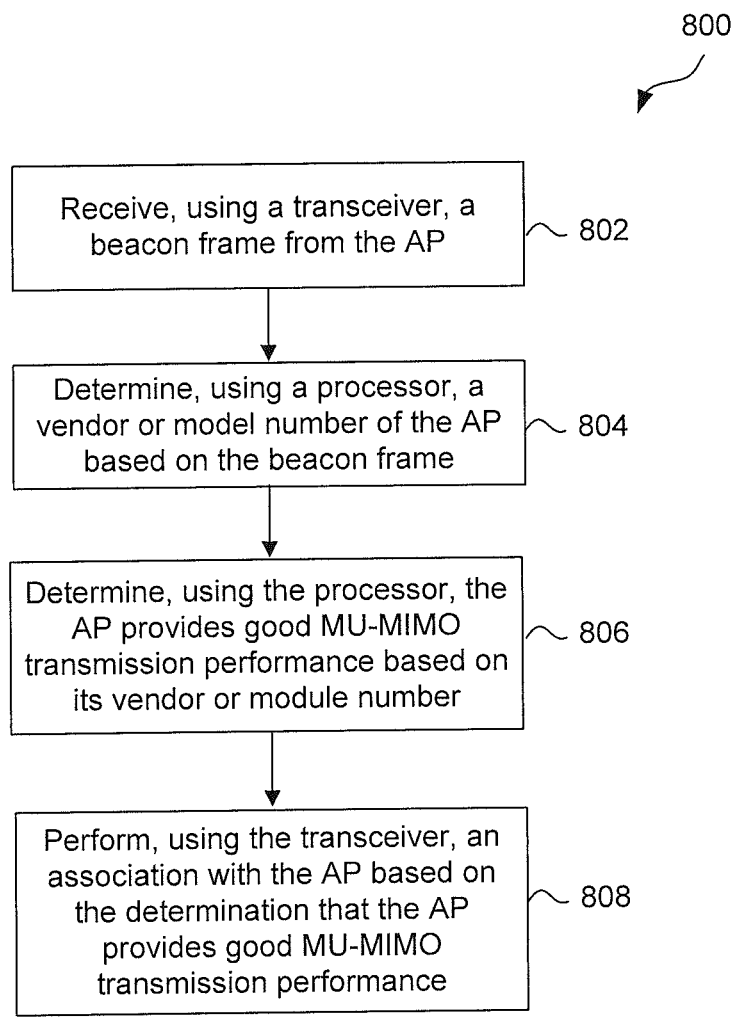
FIG. 8 is a flowchart of an example method for indicating a MU-MIMO transmission capability to an AP based on the particular type of AP, according to some embodiments.

FIG. 8 is a flowchart of an example method 800 for indicating a MU-MIMO transmission capability to an AP based on its vendor and or model number, according to some embodiments. Method 800 can be performed by processing logic that can include hardware (e.g., circuitry, dedicated logic, programmable logic, microcode, etc.), software (e.g., instructions executing on a processing device), or a combination thereof.

In 802, a STA (e.g., STA 500), using a transceiver (e.g., transceiver 520), receives a standard compliant beacon frame from AP 102. The beacon frame may include standard compliant fields, e.g., as specified in the IEEE 802.11ac wave2 standard (current proposals and/or future versions) or various other wireless communication protocols. A beacon frame is a standard management frame used by AP 102 to communicate the characteristics of the WLAN to STAs. This information can be used by STAs trying to connect to the WLAN, as well as STAs already associated with the WLAN (e.g., associated with the BSS). A beacon frame can be periodically sent by AP 102. A beacon frame can include a VHT capability field. The VHT Capability can indicate whether AP 102 supports a MU-MIMO transmission. For example, AP 102 can set a MU-MIMO beamformer bit in the VHT capability field to "1" to indicate AP 102 supports a MU-MIMO transmission.

In 804, the STA, using a processor, determines a vendor and or model number of AP 102 based on the beacon frame. The STA can determine the model number of AP 102 from a standard compliant field in the beacon frame containing the model number of AP 102. In some other embodiments, the STA can determine the vendor and or the model number of AP 102 from an IE in the beacon frame that specifies the vendor and or the model number of AP 102.

In 806, the STA, using the processor, determines AP 102 provides good MU-MIMO transmission performance based on the vendor and or the model number of AP 102. For example, when the STA determines from an IE in the beacon frame that AP 102 is a model of AP that is known to provide good MU-MIMO transmission performance. The STA can look up the vendor and or model number of AP 102 in a database stored in a memory (e.g., memory 535) accessible by a processor (e.g., processor 510) of the STA.

In 808, the STA, using the transceiver, performs an association with AP 102 in which it indicates it is capable of receiving a MU-MIMO transmission based the determination in 806. Specifically, the STA, using the transceiver, can transmit an association response frame to AP 102 indicating it is capable of receiving a MU-MIMO transmission.

Figure 9:
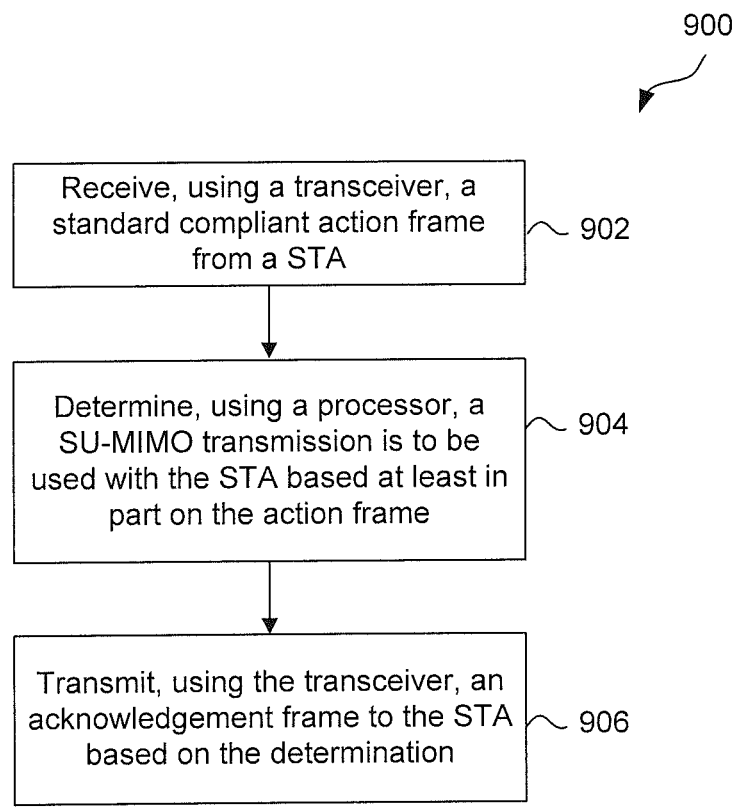
FIG. 9 is a flowchart of an example method for implementing MU-MIMO transmission toggling at an AP, according to some embodiments.

FIG. 9 is a flowchart of an example method 900 for implementing MU-MIMO transmission toggling at an AP, according to some embodiments. Method 900 can be performed by processing logic that can include hardware (e.g., circuitry, dedicated logic, programmable logic, microcode, etc.), software (e.g., instructions executing on a processing device), or a combination thereof.

In 902, an AP (e.g., AP 600) receives, by a transceiver (e.g., transceiver 620), a standard compliant action frame from a STA (e.g., STA 104, 106, 108, or 110) according to a wireless communication protocol (e.g., the IEEE 802.11ac wave2 standard (current proposals and/or future versions)). The action frame can comprise an action field that species a preference to join a single-user multiple input multiple output (SU-MIMO) transmission from the AP.

In some embodiments, the action frame can indicate a cause for why the STA does not want to not join a MU-MIMO transmission. For example, a cause field of the action frame can indicate the cause for why the STA does not want to join a MU-MIMO transmission (e.g., the STA is overheating or low on battery).

In some embodiments, the action frame can indicate the severity of the cause for why the STA does not want to join a MU-MIMO transmission. For example, a cost field of the action frame can indicate the severity of the cause for why the STA does not want to join a MU-MIMO transmission.

In 904, the AP determines, using a processor (e.g., processor 610), a SU-MIMO transmission is to be used with the STA based on the action frame. This may involve the AP determining that an action field of the action frame species a preference to join a single-user multiple input multiple output (SU-MIMO) transmission from the AP. This may further involve the AP determining that a vendor identifier in an organization identifier field in the action frame matches a vendor of the AP. In some embodiments, the AP may determine a SU-MIMO transmission is to be used with the STA based on a cause for joining the SU-MIMO transmission specified in the cause field in the action frame.

In 906, the AP transmits, by the transceiver, an acknowledgement frame to the STA based on the determination in 904. The acknowledgement frame can indicate the AP is configured to use the SU-MIMO transmission with the STA.

Various embodiments can be implemented, for example, using systems, such as STA 500 and AP 600. STA 500 can be used, for example, to implement methods 700 and 800 of FIGS. 7 and 8. AP 600 can be used, for example, to implement method 900 of FIG. 9.

Figure 10:
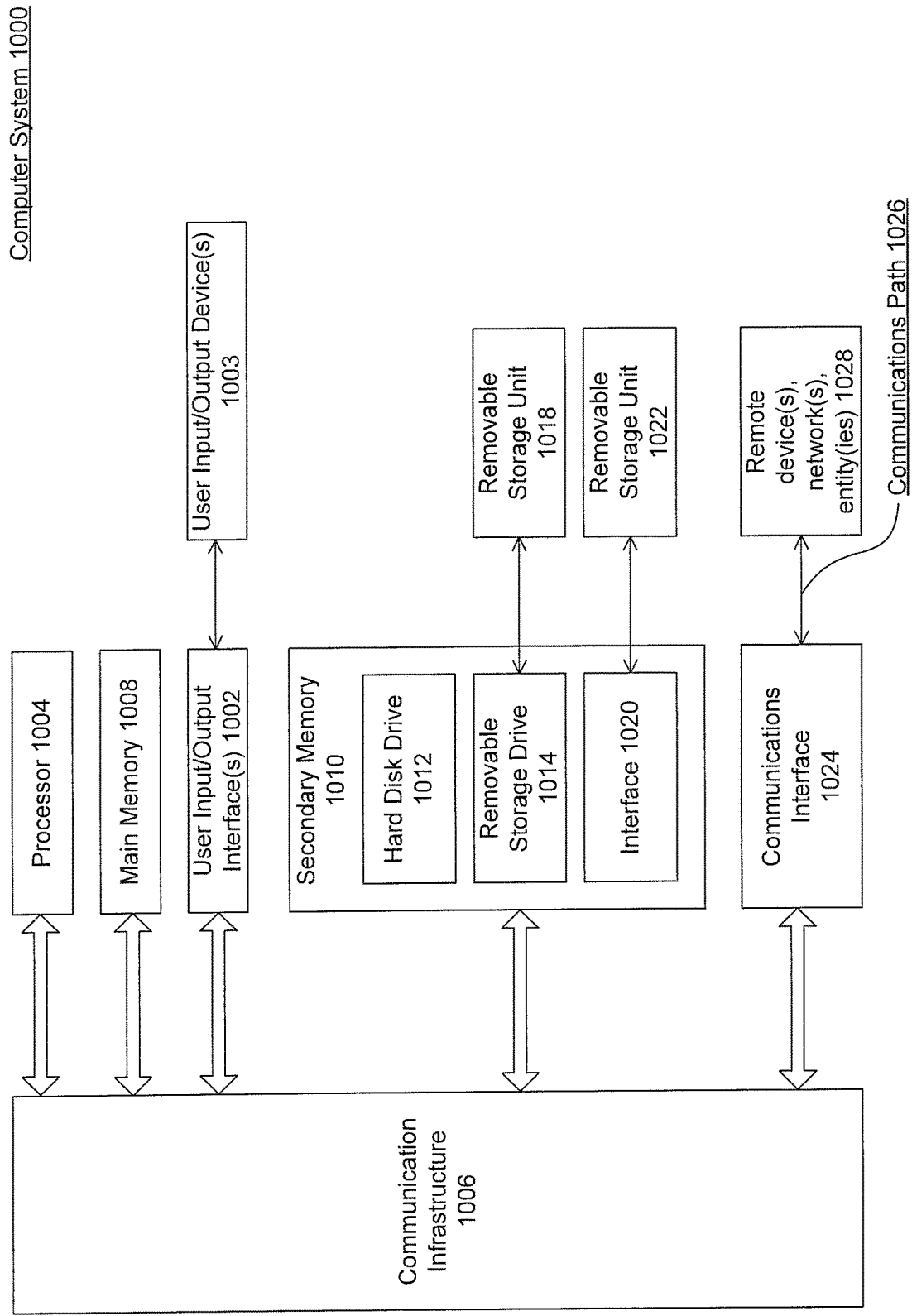
FIG. 10 is an example computer system for implementing various embodiments.

Various embodiments can also be implemented, for example, using one or more computer systems, such as computer system 1000 shown in FIG. 10. Computer system 1000 can be used, for example, to implement methods 700, 800, and 900 of FIGS. 7-9, respectively. For example, computer system 1000 can generate a standard compliant action frame including a preference to join a SU-MIMO or MU-MIMO transmission. Computer system 1000 can then transmit the action frame to an AP to indicate its preference to join the SU-MIMO or MU-MIMO transmission from the AP, according to some embodiments. Computer system 1000 can be any computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In embodiments, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to embodiments, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Communication interface 1024 can also be referred to as a transceiver. Control logic and/or data may be transmitted to and from computer system 1000 via communication path 1026.

In embodiments, a tangible apparatus or article of manufacture including a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the disclosure herein using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer implemented method for indicating, by a station, a preference to receive a single-user multiple input multiple output (SU-MIMO) transmission from an access point (AP), comprising:
generating, by the station, an Institute of Electrical and Electronics Engineers (IEEE) 802.11 standard compliant action frame, wherein the IEEE 802.11 standard compliant action frame comprises a IEEE 802.11 standard compliant action field that specifies a preference request to receive the SU-MIMO transmission from the AP, and the IEEE 802.11 standard compliant action frame comprises a cause field and a cost field, where the cause field indicates a cause for preferring to receive the SU-MIMO transmission from the AP, and the cost field indicates a cost associated with the cause:
transmitting, by the station, the IEEE 802.11 standard compliant action frame to the AP;
receiving, by the station, an acknowledgement frame from the AP, wherein the acknowledgement frame indicates the AP is configured to transmit the SU-MIMO transmission to the station; and
receiving, by the station, data from the AP via the SU-MIMO transmission.

2. The method of claim 1, wherein the IEEE 802.11 standard compliant action frame is specified as a vendor specific action frame based at least in part on a category field in the IEEE 802.11 standard compliant action frame.

3. The method of claim 1, wherein the IEEE 802.11 standard compliant action field comprises an organization identifier field and a multi-user (MU) toggle field, and wherein the organization identifier field specifies a vendor identifier for the AP, and the MU toggle field specifies the preference to receive the SU-MIMO transmission.

4. The method of claim 1, the receiving the data from the AP via the SU-MIMO transmission further comprising:
receiving, by the station, the data from the AP via the SU-MIMO transmission until expiration of a timer, wherein the timer is set based at least in part on the receiving of the acknowledgement frame from the AP.

5. The method of claim 1, further comprising:
generating, by the station, a second IEEE 802.11 standard compliant action frame, wherein the second IEEE 802.11 standard compliant action frame comprises a second IEEE 802.11 standard compliant action field that indicates a second preference request to join a multi-user multiple input multiple output (MU-MIMO) transmission;
transmitting, by the station, the second IEEE 802.11 standard compliant action frame to the AP;
determining, by the station, that a second acknowledgement frame was not received from the AP in response to the second IEEE 802.11 standard compliant action frame; and
retransmitting, by the station, the second IEEE 802.11 standard compliant action frame to the AP responsive to expiration of a timer.

6. The method of claim 1, the transmitting further comprising: transmitting, by the station, the IEEE 802.11 standard compliant action frame in response to
receiving a channel sounding frame from the AP.

7. The method of claim 1, the transmitting further comprising: transmitting, by the station, the IEEE 802.11 standard compliant action frame based at least
in part on a presence of incoming traffic for the station.

8. The method of claim 1, the transmitting further comprising: transmitting, by the station, the IEEE 802.11 standard compliant action frame to the AP after
completing an in progress transmission.

9. The method of claim 1, further comprising:
receiving, by the station, a beacon frame from the AP, wherein the beacon frame comprises an information element that specifies at least one of a vendor or a model number of the AP;
generating, by the station, an association request frame based at least in part on the information element, wherein the association request frame indicates the station is capable of receiving a multi-user multiple input multiple output (MU-MIMO) transmission; and
transmitting, by the station, the association request frame to the AP.

10. An access point (AP), comprising: a memory;
a transceiver; and
at least one processor communicatively coupled to the memory and the transceiver, wherein the at least one processor is configured to:
receive, by the transceiver, an Institute of Electrical and Electronics Engineers (IEEE) 802.11 standard compliant action frame from a station, wherein the IEEE 802.11 standard compliant action frame comprises a IEEE 802.11 standard compliant action field that specifies a preference request to receive a single-user multiple input multiple output (SU-MIMO) transmission from the AP, and the IEEE 802.11 standard compliant action frame comprises a cause field and a cost field, where the cause field indicates a cause for preferring to receive the SU-MIMO transmission from the AP, and the cost field indicates a cost associated with the cause:
determine to use the SU-MIMO transmission with the station based at least in part on the preference request; and
transmit, by the transceiver, an acknowledgement frame to the station responsive to the determination, wherein the acknowledgement frame indicates that the AP is configured to use the SU-MIMO transmission with the station.

11. The AP of claim 10, wherein the IEEE 802.11 standard compliant action frame comprises a vendor specific action frame based at least in part on a category field in the IEEE 802.11 standard compliant action frame, and the at least one processor is further configured to:
determine that a vendor identifier in an organization identifier field in the IEEE 802.11 standard compliant action frame matches a vendor of the AP.

12. The AP of claim 10, wherein to determine to use the SU-MIMO transmission with the station the at least one processor is further configured to:
determine to use the SU-MIMO transmission with the station based at least in part on the cause for preferring to receive the SU-MIMO transmission from the AP specified in the cause field.

13. The AP of claim 10, wherein the at least one processor is further configured to:
transmit, by the transceiver, a beacon frame to the station, wherein the beacon frame comprises an information element that specifies at least one of a vendor or a model number of the AP;
receive, by the transceiver, an association request frame from the station based at least in part on the information element, wherein the association request frame indicates the station is capable of receiving a multi-user multiple input multiple output (MU-MIMO) transmission; and in response to the receiving the association request frame, transmit, by the transceiver, data to the station using the MU-MIMO transmission.

14. The AP of claim 10, wherein the at least one processor is further configured to:

receive, by the transceiver, the IEEE 802.11 standard compliant action frame from the station in response to transmitting a channel sounding frame to the station.

15. A non-transitory computer-readable medium having instructions stored thereon that, when executed by at least one computing device, cause the at least one computing device to perform operations comprising:

generating an Institute of Electrical and Electronics Engineers (IEEE) 802.11 standard compliant action frame, wherein the IEEE 802.11 standard compliant action frame comprises a IEEE 802.11 standard compliant action field that specifies a preference request to join a multi-user multiple input multiple output (MU-MIMO) transmission from an AP;

transmitting, by a transceiver, the IEEE 802.11 standard compliant action frame to the AP; receiving, by the transceiver, an acknowledgement frame from the AP, wherein the acknowledgement frame indicates whether the AP decided to use a single-user multiple input multiple output (SU-MIMO) transmission or the MU-MIMO transmission with the at least one computing device based on the preference request; and receiving, by the transceiver, data from the AP according to the SU-MIMO transmission or the MU-MIMO transmission indicated in the acknowledgment frame.

16. The non-transitory computer-readable medium of claim 15, wherein the IEEE 802.11 standard compliant action frame is specified as a vendor specific action frame based at least in part on a category field in the IEEE 802.11 standard compliant action frame.

17. The non-transitory computer-readable medium of claim 15, wherein the IEEE 802.11 standard compliant action field comprises an organization identifier field, a multi-user (MU) toggle field, a data stream field, and a bandwidth field, and wherein the organization identifier field specifies a vendor identifier associated with the AP, the MU toggle field specifies the preference request to join the MU-MIMO transmission, the data stream field specifies a preference for a number of data streams to use in the MU-MIMO transmission, and the bandwidth field specifies a preference for a bandwidth amount to use in the MU-MIMO transmission.

18. The non-transitory computer-readable medium of claim 15, wherein the receiving comprises:

receiving, by the transceiver, the data from the AP according to the SU-MIMO transmission or the MU-MIMO transmission indicated in the acknowledgment frame until expiration of a timer, wherein the timer is set based at least in part on the receiving of the acknowledgement frame from the AP.

19. The method of claim 1, the generating further comprising: generating, by the station, the IEEE 802.11 standard compliant action frame based on a vendor number or a model number of the AP.

20. The method of claim 1, wherein the cause field specifies the station is overheating or a power usage of the station is above a threshold level.

21. The AP of claim 10, wherein the cause field specifies the station is overheating or a power usage of the station is above a threshold level.

22. The non-transitory computer-readable medium of claim 15, wherein the acknowledgement frame indicates whether the AP decided to use the SU-MIMO transmission or the MU-MIMO transmission with the at least one computing device based on at least one of an amount of overhead associated with the MU-MIMO transmission, a current network utilization, or a number of stations in the MU-MIMO transmission.

\* \* \* \* \*